United States Patent [19]

Misono

[11] Patent Number: 5,321,072

[45] Date of Patent: Jun. 14, 1994

[54] RUBBER COMPOSITION

[75] Inventor: Shinji Misono, Gotenba, Japan

[73] Assignee: Tokai Carbon Co., Ltd., Tokyo, Japan

[21] Appl. No.: 44,067

[22] Filed: Apr. 6, 1993

Related U.S. Application Data

[63] Continuation-in-part of Ser. No. 797,010, Nov. 25, 1991.

[30] Foreign Application Priority Data

Nov. 30, 1990 [JP] Japan .................. 2-340732

[51] Int. Cl.$^5$ .................................... C08K 3/04
[52] U.S. Cl. .................... 524/496; 524/495; 423/445 R
[58] Field of Search ............... 524/495, 496; 423/445

[56] References Cited

U.S. PATENT DOCUMENTS

| | | | |
|---|---|---|---|
| 4,360,627 | 11/1982 | Okado et al. | 524/496 |
| 4,398,582 | 8/1983 | Yuto et al. | 524/496 |
| 4,477,621 | 10/1984 | Sato et al. | 524/496 |
| 4,478,973 | 10/1984 | Misono et al. | 524/496 |
| 4,500,672 | 2/1985 | Suzuki et al. | 524/496 |
| 4,548,980 | 10/1985 | Nagata et al. | 524/496 |
| 4,550,135 | 10/1985 | Iwama et al. | 524/496 |
| 4,732,927 | 3/1988 | Ida et al. | 524/496 |
| 5,019,617 | 5/1991 | Kaidoo et al. | 524/496 |

OTHER PUBLICATIONS

Patent Abstract of Japan of JP-59-184231, dated Oct. 19, 1984.
Patent Abstract of Japan of JP-59-140241, dated Aug. 11, 1984.
Patent Abstract of Japan of JP-63-225639, dated Sep. 20, 1988.
Patent Abstract of Japan of JP-1-201367, dated Aug. 14, 1989.

*Primary Examiner*—Paul R. Michl
*Assistant Examiner*—Olga Asinovsky
*Attorney, Agent, or Firm*—Armstrong, Westerman, Hattori, McLeland & Naughton

[57] ABSTRACT

A rubber composition comprising: 100 parts by weight of a rubber component and 35 to 100 parts by weight of a furnace carbon black having a nitrogen adsorption specific surface area ($N_2SA$) of from 60 to 100 m$^2$/g, a dibutyl phthalate absorption (DBP) of from 90 to 150 ml/100 g, a $\Delta DBP$ (DBP24M4DBP) of from 15 to 40 ml/100 g, an aggregate size distribution ($\Delta Dst$) of from 50 to 150 nm, and an intraaggregate pore mode diameter ($\overline{D}p$) which satisfies the following formula:

$$\overline{D}p \leq 1.543\overline{D}st - 55.0$$

wherein $\overline{D}p$ represents the mode diameter of the maximum frequency in a carbon black intraaggregate pore diameter distribution determined using a differential scanning calorimeter (DSC) and $\overline{D}st$ represents the mode Stokes diameter of carbon black aggregates determined using a disk centrifuge (DCF).

1 Claim, No Drawings

RUBBER COMPOSITION

This application is a continuation-in-part of application Ser. No. 07/797,010, filed Nov. 25, 1991.

BACKGROUND OF THE INVENTION

The present invention relates to a rubber composition suitable for use in the preparation of treads of tires for passenger cars and light trucks. More particularly, the present invention relates to a rubber composition having both an excellent abrasion resistance and a low heat build-up and simultaneously a high impact resilience.

Carbon blacks for reinforcement of rubbers are classified into many different types by the properties possessed thereby. The properties of carbon blacks are a major factor which determines various characteristics of rubber compositions when the carbon blacks are compounded with a rubber to form a rubber composition. Therefore, generally, in the compounding of a carbon black with a rubber, a carbon black which can impart the properties suitable for use to the rubber component has been chosen.

For example, for these several years, intensive development efforts for low fuel consumption tires have been made in accordance with the social demand for saving resources and energy.

A low heat build-up rubber composition having a high impact resilience, in which a carbon black of a grade with a relatively large particle size is compounded with a rubber component in a relatively small amount, is useful for the preparation of low fuel consumption tires. Although compounding of a carbon black having a large particle size and a small specific surface area with a rubber component is effective in reducing the fuel consumption of tires, it makes it difficult to avoid the lowering of traction on braking on wet road surfaces and abrasion resistance.

If it is possible to impart a high abrasion resistance and a high impact resilience, together with a low heat build-up, to a rubber component by the use of a carbon black having a small particle size and a large specific surface area, which is known to effectively improve the abrasion resistance, the obtained rubber composition would be ideal as a rubber composition for use in tire treads.

Some proposals have been made on a carbon black capable of simultaneously imparting to a rubber composition a high abrasion resistance and a low heat build-up which are contradictory to each other. For example, the following proposals (a) to (f) can be mentioned.

(a) a carbon black having a nitrogen adsorption specific surface area ($N_2SA$) of 60 m$^2$/g or more, a dibutyl phthalate adsorption number of compressed sample (24M4DBP) of 112 ml/100 g or more, and each of an aggregate Stokes mode diameter and an aggregate Stokes mode distribution maintained above a specific value, which can simultaneously impart a high reinforcing performance and a high impact resilience to a compounded rubber (Japanese patent application Kokai publication No. 64-53978);

(b) a rubber composition having both a high abrasion resistance and a high impact resilience and containing a carbon black which has a $N_2SA$ of 60 m$^2$/g or more, a DBP of 108 ml/100 g or more, a true specific gravity per predetermined specific surface area set within a specific range markedly lower than that of the conventional carbon blacks, and a tinting strength (Tint) and a distribution width per aggregate mode distribution each maintained above a specific value (Japanese patent application Kokai publication No. 59-140241);

(c) a carbon black having a $N_2SA$ of from 65 to 84 m$^2$/g and a ratio of $N_2SA$ to iodine adsorption number (IA) of from 1.10 to 1.35, wherein the value of a formula including as variables 24M4DBP, blackness, iodine adsorption number and aggregate mode diameter is set to be above a specific value and which can simultaneously impart a high abrasion resistance and a high impact resilience to a compounded rubber (Japanese patent application Kokai publication No. 62-58792);

(d) a carbon black having a $N_2SA$ of from 75 to 105 m$^2$/g, a 24M4DBP of 110 ml/100 g or more, a true specific gravity per predetermined specific surface area set within a specific range markedly lower than that of the conventional carbon blacks, and each of an intraaggregate pore diameter and a distribution width per aggregate mode diameter set above a specific value, which can simultaneously impart a high abrasion resistance and a high impact resilience to a compounded rubber (Japanese patent application Kokai publication No. 64-201367);

(e) a carbon black for use in tire tread rubbers which has a $N_2SA$ of from 85 to 95 m$^2$/g, a 24M4DBP of from 100 to 104 ml/100 g, a Tint of from 95 to 100% and a mode distribution of the aggregate Stokes diameter ($\Delta D_{50}$) of 180 μm or more, and which can attain a high abrasion resistance and a high impact resilience (U.S. Pat. No. 4,360,627); and (f) a carbon black for use in tire tread rubbers for energy saving, having a $N_2SA$ of from 75 to 105 m$^2$/g, satisfying the relationships $N_2SA - IA \geq 15$, $N_2SA - C$-TAB (cetyltrimethylammonium bromide) surface area $\leq 5$, 24M4DBP$\leq 110$, Tint$=90$ to $110$ and $\Delta$Tint$\leq -3$, and capable of imparting a low rolling resistance and a high wet traction performance to a rubber composition (U.S. Pat. No. 4,548,980).

Despite the above proposals, the requirement for low fuel consumption tires is escalating and the demand for the development of a low heat build-up rubber composition having a high impact resilience while maintaining an excellent abrasion resistance is still strong in the art.

SUMMARY OF THE INVENTION

An object of the present invention is to provide a rubber composition suitable for use in treads of tires for passenger cars and light trucks, which has both a high abrasion resistance and a low heat build-up together with a high impact resilience. This object of the present invention can be accomplished by a rubber composition comprising 100 parts by weight of a rubber component and 35 to 100 parts by weight of a furnace carbon black having a nitrogen adsorption specific surface area ($N_2SA$) of from 60 to 100 m$^2$/g, a dibutyl phthalate absorption (DBP) of 90 to 150 ml/100 g, a $\Delta$DBP (DBP$-$24M4DBP) of 15 to 40 ml/100 g, an aggregate size distribution ($\Delta$Dst) of 50 to 150 nm, and an intraaggregate pore mode diameter ($\overline{D}_p$) which satisfies the following formula (1):

$$\overline{D}_p \leq 1.543 \overline{D}_{st} - 55.0 \tag{1}$$

wherein $\overline{D}_p$ represents the mode diameter of the maximum frequency in a carbon black intraaggregate pore diameter distribution determined using a differential scanning calorimeter (DSC) and $\overline{D}_{st}$ represents the mode Stokes diameter of carbon black aggregates determined using a disk centrifuge (DCF).

DESCRIPTION OF THE PREFERRED EMBODIMENTS

The properties of carbon blacks used in the present invention are determined according to the following methods. Nitrogen adsorption specific surface area (N₂SA): measured in accordance with ASTM D3037-88 "Standard test method for carbon black surface area by nitrogen adsorption" Method B. The N₂SA of IRB #6 measured by this method was 76 m²/g. DBP (Dibutyl phthalate absorption): JIS K6221 (1975) "Method of Testing Carbon Black for Rubber", § 6.1.2. Method A (corresponding to ASTM D2414-82).

A prescribed quantity of dry carbon black was placed in a mixing chamber of an absorptometer. Dibutyl phthalate was added dropwise to the carbon black from a buret with mixing. The buret was closed automatically by the action of a limit switch when the torque of the rotor in the mixing chamber reached a predetermined value. The absorption was calculated from the following equation:

$$DBP = \frac{V}{W_D} \times 100$$

wherein:
DBP: absorption of dibutyl phthalate (ml/100 g);
V: volume of dibutyl phthalate added (ml); and
$W_D$: quantity of dry carbon black (g).

ΔDst (Aggregate size distribution): The range of aggregate size distribution (ΔDst) is defined as the difference (nm) between two equivalent Stokes diameters at two points (nm) on the distribution curve of aggregates at which the abosrbance is 50% of the maximum absorbance.

The ΔDst of ASTM D24 Standard Reference Black C-3 (N234) is 60 nm.

24M4DBP: ASTM D3493-85a "Standard Test Method for Carbon Black-Dibutyl Phthalate Absorption Number of Compressed Sample". $\overline{D}_p$: This represents the mode diameter of the maximum frequency in a carbon black intraaggregate pore diameter distribution determined using a differential scanning calorimeter (DSC), and measured by the following method described in the paper of Brun et al.

A carbon black sample dried in accordance with JIS K6221 (1982) 5 "How to Prepare Dry Sample" is accurately weighed out and mixed with distilled water to prepare a paste having a carbon black concentration of 0.250 g/cm³. The paste is treated with supersonic waves to effect satisfactory dispersion. Immediately after the supersonic wave dispertion, about 3 to 5 mg of the carbon black paste is accurately weighed into an aluminum sample container, sealed, and placed in a differential scanning calorimeter (DSC 30 manufactured by Mettler) to conduct the measurement through the steps of:

(1) rapid cooling from room temperature to −80° C.;
(2) heating from −80° C. to −5° C. at a rate of 10° C./min;
(3) heating from −5° C. to −0.1° C. at a rate of 1° C./min, followed by keeping at −0.1° C. (a temperature 0.1° C. lower than the freezing point of distilled water) for 10 min, and
(4) gradual cooling from −0.1° C. to −8° C. at a rate of 0.1° C./min to record the freezing thermogram on a recorder.

Subsequently, freezing point depression width ΔT of distilled water is read from the temperature along the axis of abscissa of the freezing thermogram, and y (mm) per 0.1° C. is read from the axis of ordinate. The obtained values are substituted for ΔT and y in the following formulae (A) and (B) to thereby obtain a pore distribution ($\Delta V/\Delta D_p$):

$$D_P = \frac{135.34}{\Delta T} + 1.14 \quad (A)$$

$$\Delta V/\Delta D_P = K \cdot \frac{(\Delta T)^2}{Wa} xy \quad (B)$$

wherein Wa is the heat of solidification of distilled water, and K represents a factor for taking into consideration the sensitivity of the DSC and the quantity of the sample.

The pore diameter ($D_p$) giving the maximum $\Delta V/\Delta D_p$ value in the pore distribution $\Delta V/\Delta D_p = f(D_p)$, obtained according to the above formula (B), is defined as $\overline{D}_p$ ($D_p$ mode diameter).

The above-mentioned paper of Brun et al appeared in Thermochimica Acta, 21 (1977), 59-88 "A new method for the simultaneous determination of the size and the shape of pores: the thermoporometry".

The $\overline{D}_p$ of ASTM D-24 Standard Reference Black C-3 (N234) measured by this method is 77.6 nm. $\overline{D}_{st}$: Dry carbon black sample is mixed with a 20% aqueous ethanol solution containing a small amount of a surfactant to prepare a dispersion having a carbon black concentration of 50 mg/l. This dispersion is thoroughly dispersed by supersonic treatment to thereby obtain a sample. The speed of revolution of a disk centrifuge (manufactured by Joyes Lobel, the United Kingdom) is set at 8000 rpm, and 10 ml of a spin liquid (2% aqueous glycerin solution) is added. Further, 1 ml of a buffer (aqueous ethanol solution) is injected thereinto.

Thereafter, 0.5 ml of the sample is added with a syringe to start centrifugation, and simultaneously a recorder is actuated to optically prepare a distribution curve of the aggregate Stokes diameter. The Stokes diameter of the maximum frequency in the obtained distribution curve is defined as $\overline{D}_{st}$. The $\overline{D}_{st}$ of ASTM D-24 Standard Reference Black C-3 (N234) measured by this method is 80 nm.

IA: This value was determined according to the testing method for rubber-compounding carbon black, JIS K6221 (1975), §6.1.1. (corresponding to ASTM D1510-81).

Namely, 0.5±0.0005 g of a dried carbon black sample was precisely weighed out into a 200 ml Erlenmeyer flask with a stopper, 25 ml of a 0.0473N iodine solution was added thereto, and the resulting mixture was shaken for 1 minute at room temperature at a shaking number of above 120 strokes/min. The carbon black was separated and 20 ml of the filtrate was titrated with a 0.0394N sodium thiosulfate solution (a ml). Separately, a blank test was performed by the same procedure as above (b ml). The iodine adsorption number per g of the dried carbon black was calculated according to the following equation.

$$IA = (b-a)/b \times (V/W_D) \times N \times 126.91 \times f$$

wherein:
IA: iodine adsorption number (mg/g);
$W_D$: weight of dry carbon black (g);
V: amount of iodine solution added (ml);
N: normality of iodine solution (0.047); and
f: factor of iodine solution.

Tint: JIS K6221-82 "Testing Method for Rubber-Compounding Carbon Black", §6.1.3. IRB #3 was used as a control sample.

A dry carbon black sample in an amount of 0.1000 g (±0.0002 g) was mixed with 3.000 g of zinc oxide and 1.50 ml of linseed oil by using a Hoover type muller with 125 rotations (25 rotations in one mixing, repeated 5 times) under a load of 6.8 kg (15 lbs). The resulting paste was applied in a prescribed thickness onto a glass plate using a film applicator (0.002 inch). The reflectance (T) of the carbon black paste applied onto the glass plate was measured with a reflection photometer (Densicron, Welch Scientific Co., A9155, reflector head *3832A) which was so adjusted as to indicate 50% reflectivity for the paste of the standard carbon sample. The tinting strength of the carbon black sample was calculated from the following equation.

Tinting strength=50/T×[tinting strength (%) of standard carbon black]

CTAB: ASTM D3765-80 "Standard Test Method for Carbon Black-CTAB (cetyltrimethylammonium bromide) Surface Area".

The furance carbon black of the present invention having the aforementioned characteristic properties can be produced by controlling various conditions, such as feed rate of feedstock oil, fuel oil and air, and feeding condition of oxygen gas, using for example an oil furnace. This oil furnace comprises an air feed inlet in the tangential direction in the head portion thereof, a combustion chamber provided with a burner and a feedstock oil spray nozzle both inserted thereinto in the axial direction of the furnace, narrow reaction chambers extending from the combustion chamber, and a broad reaction chamber extending from the narrow reaction chamber and provided therein with a cooling water spray nozzle.

According to a conventional method, the carbon black in the present invention may be compounded into a rubber component for example natural rubber or synthetic diene rubbers such as styrene-butadiene rubber, polybutadiene rubber, isoprene rubber, butyl rubber and various other elastomers such as various synthetic rubbers and blended rubbers which can be reinforced with ordinary carbon blacks. The compounding amount of the carbon black is 35 to 100 parts by weight based on 100 parts by weight of the rubber component, and the carbon black may be compounded together with any other necessary ingredients such as a vulcanizing agent, a vulcanization accelerator, an antioxidant, a vulcanization aid, a softener and a plasticizer, to provide a rubber composition of the present invention.

Of the above-described properties of the furnace carbon black to be used in the present invention, the nitrogen adsorption specific surface area ($N_2SA$) range of from 60 to 100 m²/g is one belonging to hard carbon blacks and a prerequisite for imparting to a rubber composition a high abrasion resistance and an appropriate heat build-up. When the $N_2SA$ is less than 60 m²/g, the abrasion resistance is unsatisfactory. On other hand, when it exceeds 100 m²/g, the heat build-up becomes excessive, making the use as a carbon black for low fuel consumption tires especially difficult.

The intraaggregate pore mode diameter ($\overline{D}_p$) is a parameter for indicating the size of the pore generated by the complicated morphology of an aggregate resulting from fusion and mutual firm adhesion of primary particles of carbon black. It is closely related with the conditions such as reaction temperature and turbulent degree of combustion gas, in the step of carbon black formation. Therefore, $\overline{D}_p$ is correlated with the structure and specific surface area, and as a result of the present inventor's study, it has been confirmed that following formulae (C) and (D) hold with the commercially available ordinary carbon black:

$$\overline{D}_p = [75.2 \times (DBP)/(N_2SA)] \pm 3.0 \quad (C)$$

$$\overline{D}_p = (1.543\ Dst - 42.8) \pm 8.0 \quad (D)$$

The $\overline{D}_p$ of for example ASTM D-24 Standard Reference Black C-3 (N234) measured by this method is found to be 72.6 to 88.6 nm by substituting the obtained value for $\overline{D}st$ in formula (D). Measured values for $\overline{D}_p$ fall in this range. By contrast, the $\overline{D}_p$ of the carbon black to be used in the present invention is a value smaller than that obtained by substitution for $\overline{D}st$ in the above formula (D), and is identical with or smaller than the value obtained in the above formula (1). This means that in the carbon black to be used in the present invention, the size of the intraaggregate pore is relatively smaller than the size (Stokes mode diameter) of the aggregate itself. By virtue of this characteristic feature, the heat build-up can be minimized without adversely affecting the abrasion resistance of a rubber component, and the impact resilience per specific surface area can be effectively improved. Therefore, by the present invention, a rubber composition having both an excellent abrasion resistance and a low heat build-up as well as a high impact resilience imparted thereto can be provided as a result of collective exertion of the above-described various properties.

Examples of the present invention will now be described in comparison with Comparative Examples.

EXAMPLES, COMPARATIVE EXAMPLES AND REFERENCE EXAMPLES

An oil furnace was provided, which was constituted of a combustion chamber (800 mm in diameter and 600 mm in length) having an air feed port disposed in the tangential direction in the head thereof and provided with a combustion burner and a feedstock oil spray nozzle both inserted thereinto in the axial direction of the furnace, a narrow reaction chamber (160 mm in diameter and 1200 mm in length) coaxially connected to the combustion chamber and a broad reaction chamber (400 mm in diameter) coaxially connected to the narrow reaction chamber.

Used as a feedstock oil was a hydrocarbon oil having a specific gravity (15°/4° C.) of 1.073, a viscosity (Engler 40°/20° C.) of 2.10, a toluene insoluble content of 0.03% and a correlation coefficient (BMCI) of 140. Used as a fuel oil was a hydrocarbon oil having a specific gravity (15°/4° C.) of 0.903, a viscosity (cSt/50° C.) of 16.1, a residual carbon content of 5.4% and a flash point of 96%.

Using the above-described reaction furnace, feedstock oil and fuel oil, five types of furnace carbon blacks (Examples 1 to 3 and Comparative Examples 1 and 2) were prepared under conditions which were varied with respect to the feedstock oil, the fuel oil, the feeding rate of air and the addition or non-addition of oxygen gas. The properties of the obtained carbon blacks are shown in Table 1 against preparation conditions.

In the Reference Examples of Table 1, commercially available hard carbon blacks were employed. In Reference Example 1, use was made of N351 [manufactured by Tokai Carbon, SEAST NH (trade name)]; in Reference Example 2, use was made of N347 [manufactured by Tokai Carbon, SEAST 3H (trade name)]; and in Reference Example 3, use was made of N339 [manufactured by Tokai Carbon, SEAST KH (trade name)].

sitions, which were subjected to various rubber testings. The results are shown in Table 3.

The measuring methods and conditions for rubber properties are as described below. Of the parameters, the tan $\delta$ (loss factor) is an index for heat build-up. The smaller the value thereof, the smaller the heat build-up.

(1) Abrasion loss: measured using a Lambourne abrasion tester (with a mechanical slip mechanism) under the following conditions:

test pieces: 10 mm in thickness and 44 mm in outer diameter;

Emery wheel: GC type, particle size of #80, hardness

TABLE 1

| conditions and properties | | Example (Invention) 1 | 2 | 3 | Comparative Example 1 | 2 | Reference Example 1 (N351) | 2 (N347) | 3 (N339) |
|---|---|---|---|---|---|---|---|---|---|
| Preparation Conditions | air feed rate (Nm³/hr) | 2500 | 2500 | 2500 | 3000 | 3000 | — | — | — |
| | oxygen gas feed rate (Nm³/hr) | 105 | 105 | 105 | — | — | — | — | — |
| | fuel oil feed rate (Nm³/hr) | 156 | 156 | 164 | 124 | 124 | — | — | — |
| | amount of air for atomization of fuel oil (Nm³/hr) | 200 | 200 | 200 | 180 | 180 | — | — | — |
| | fuel oil combustion percentage (%) | 200 | 200 | 190 | 250 | 250 | — | — | — |
| | feedstock oil feed rate (kg/hr) | 1214 | 998 | 891 | 1293 | 1085 | — | — | — |
| Properties | IA (mg/g) | 60 | 73 | 84 | 60 | 76 | 70 | 80 | 90 |
| | N₂SA (m²/g) | 65 | 80 | 93 | 64 | 81 | 74 | 82 | 93 |
| | CTAB | 64 | 78 | 92 | 64 | 80 | 74 | 81 | 92 |
| | Tint | 92 | 102 | 107 | 91 | 99 | 100 | 102 | 111 |
| | DBP (ml/100 g) | 138 | 130 | 134 | 140 | 137 | 127 | 128 | 119 |
| | 24M4DBP | 114 | 114 | 113 | 110 | 111 | 97 | 100 | 100 |
| | ΔDBP (DBP - 24M4DBP) | 24 | 16 | 21 | 30 | 26 | 30 | 28 | 19 |
| | Dst (nm) | 142 | 118 | 109 | 123 | 110 | 113 | 106 | 93 |
| | ΔDst (nm) | 93 | 77 | 72 | 80 | 75 | 80 | 79 | 64 |
| | Dp (nm) | 160.3 | 123.9 | 105.5 | 165.5 | 129.3 | 130.8 | 119.2 | 101.0 |
| | (1.543 Dst - 55.0) value | 164.1 | 127.1 | 113.2 | 134.8 | 114.7 | 119.4 | 108.6 | 88.5 |

These carbon black samples were compounded with a styrene-butadiene rubber [manfactured by Nippon Gosei Gomu, JSR 1712 (trade name)] according to the recipe shown in Table 2.

TABLE 2

| Compounding components | Parts by weight |
|---|---|
| styrene-butadiene rubber (SBR) | 137.5 |
| carbon black | 68.75 |
| stearic acid (dispersion vulcanization aid) | 1.0 |
| zinc oxide (vulcanization aid) | 3.0 |
| N-t-butyl-2-benzothiazylsulfeneamide sulfur (vulcanizing promoter) | 1.38 |
| sulfur (vulcanizing agent) | 1.75 |

The compounds thus prepared were vulcanized at 145° C. for 50 minutes to thereby obtain rubber compoof H;

added carborundum powder: particle size of #80, amount of addition of 9 g/min;

relative slip ratio of wheel surface to test piece: 24%, 60%;

speed of revolution of test pieces: 535 rpm; and load on test pieces: 4 kg.

(2) tan $\delta$ (loss factor): measured using a Visco Elastic Spectrometer (manufactured by Iwamoto Seisakusho Co.) under the following conditions:

test pieces: 2 mm in thickness, 30 mm in length, 5 mm in width;

frequency: 50 Hz;

dynamic strain $\epsilon$: 1.2%; and temperature: 60° C.

(3) Other properties: measured according to JIS K6301 "Physical Testing Methods for Vulcanized Rubbers".

TABLE 3

| Rubber Properties | Example (Invention) 1 | 2 | 3 | Comparative Example 1 | 2 | Reference Example 1 (N351) | 2 (N347) | 3 (N339) |
|---|---|---|---|---|---|---|---|---|
| *abrasion resistance | | | | | | | | |
| 24% slip | 87 | 94 | 99 | 82 | 93 | 87 | 96 | 100 |
| 60% slip | 90 | 97 | 102 | 86 | 98 | 91 | 95 | 100 |
| tan $\delta$ (loss factor) | 0.183 | 0.202 | 0.211 | 0.204 | 0.228 | 0.209 | 0.233 | 0.244 |
| hardness | 65 | 66 | 67 | 65 | 66 | 64 | 65 | 66 |

TABLE 3-continued

| Rubber Properties | Example (Invention) 1 | 2 | 3 | Comparative Example 1 | 2 | Reference Example 1 (N351) | 2 (N347) | 3 (N339) |
|---|---|---|---|---|---|---|---|---|
| (JIS, Hs) | | | | | | | | |
| 300% modulus (kg/cm$^2$) | 157 | 148 | 149 | 164 | 152 | 137 | 140 | 144 |
| tensile strength (kg/cm$^2$) | 244 | 263 | 265 | 238 | 259 | 259 | 257 | 261 |
| elongation (%) | 490 | 500 | 520 | 470 | 510 | 540 | 540 | 530 |
| impact resilience (%) | 42.8 | 42.1 | 40.7 | 40.2 | 36.9 | 38.9 | 37.1 | 35.3 |

*Abrasion resistance was determined with reference to the value of Reference Example 3.

From the results shown in Table 3, it is seen that the rubber compositions of Examples 1 to 3 according to the present invention exhibit a significantly lowered tan δ, which is an index for the heat build-up, and a markedly improved impact resilience, while possessing an identical or improved abrasion resistance, as compared with those of the Comparative Examples and Reference Examples which have the same level of N$_2$SA but fall outside the features of the present invention. Further, it is seen that the other reinforcing performance are maintained on a high level.

As described above, according to the present invention, a low heat build-up rubber composition having both an excellent abrasion resistance and a high impact resilience is provided by selecting and controlling microscopic properties of carbon blacks as different from the prior art. Accordingly, effective fuel consumption reduction can be attained in the application to treads of tires for passenger cars and light trucks.

What is claimed is:

1. A rubber composition comprising: 100 parts by weight of a rubber component and 35 to 100 parts by weight of a furnace carbon black having a nitrogen adsorption specific surface area (N$_2$SA) of from 60 to 100 m$^2$/g, a dibutyl phthalate absorption (DBP) of from 90 to 150 ml/100 g, a ΔDBP (DBP24M4DBP) of from 15 to 40 ml/100 g, an aggregate size distribution (ΔDst) of from 50 to 150 nm, and an intraaggregate pore mode diameter ($\overline{D}_p$) which satisfies the following formula:

$$\overline{D}_p \leq 1.543\ \overline{D}_{st} - 55.0$$

wherein $\overline{D}_p$ represents the mode diameter of the maximum frequency in a carbon black intraaggregate pore diameter distribution determined using a differential scanning calorimeter (DSC) and $\overline{D}_{st}$ represents the mode Stokes diameter of carbon black aggregates determined using a disk centrifuge (DCF).

* * * * *